United States Patent [19]

Prejean

[11] Patent Number: 5,087,669
[45] Date of Patent: Feb. 11, 1992

[54] VINYL CHLORIDE POLYMER COMPOSITION WITH IMPROVED FUSION PROPERTIES

[75] Inventor: Thomas G. Prejean, Brusly, La.

[73] Assignee: The Dow Chemical Company, Midland, Mich.

[21] Appl. No.: 408,589

[22] Filed: Sep. 18, 1989

[51] Int. Cl.⁵ .................... C08L 23/28; C08L 23/20; C08L 27/06

[52] U.S. Cl. .................... 525/239; 525/192; 525/240; 525/227; 524/527; 524/489; 524/278

[58] Field of Search ............. 525/239, 192; 524/278

[56] References Cited

U.S. PATENT DOCUMENTS

| | | | |
|---|---|---|---|
| 3,356,638 | 12/1967 | Barrett | 260/33.8 |
| 3,442,837 | 5/1969 | Brotz et al. | 260/23 |
| 3,454,544 | 7/1969 | Young et al. | 260/88.2 |
| 3,459,692 | 8/1969 | Buning et al. | 260/23 |
| 3,682,924 | 8/1972 | Blanchard | 260/28.5 D |
| 3,819,554 | 6/1974 | Blanchard | 260/28.5 D |
| 3,845,166 | 10/1974 | Betts et al. | 260/897 C |
| 3,940,456 | 2/1976 | Frey et al. | 260/897 C |
| 3,979,347 | 9/1976 | Brotz et al. | 260/28.5 D |
| 4,037,020 | 7/1977 | Ishii et al. | 428/518 |
| 4,040,996 | 8/1977 | Vonno | 260/23 XA |
| 4,040,997 | 8/1977 | Vonno | 260/23 XA |
| 4,089,726 | 5/1978 | Ishii et al. | 156/306 |
| 4,113,805 | 9/1978 | Frey et al. | 260/897 C |
| 4,132,691 | 1/1979 | Ejk | 260/23 XA |
| 4,203,880 | 5/1980 | Staloff et al. | 260/23 XA |
| 4,213,891 | 7/1980 | Wear | 260/45.75 S |
| 4,234,703 | 11/1980 | Lindsay | 525/211 |
| 4,246,150 | 1/1981 | Bower | 260/28.5 D |
| 4,280,940 | 7/1981 | Klug et al. | 260/23 XA |
| 4,459,388 | 7/1984 | Hettche et al. | 525/376 |
| 4,481,333 | 11/1984 | Fleischer et al. | 525/192 |
| 4,501,848 | 2/1985 | Bourland | 524/527 |
| 4,501,849 | 2/1985 | Bourland | 524/527 |
| 4,501,850 | 2/1985 | Bourland | 524/527 |
| 4,677,163 | 6/1987 | Tada et al. | 525/190 |
| 4,680,334 | 7/1987 | Wallace | 521/496 |
| 4,767,823 | 8/1988 | Jones et al. | 525/334.1 |
| 4,778,856 | 10/1988 | Chen et al. | 525/190 |

OTHER PUBLICATIONS

*Chemical Abstracts* 87:152921k "Lubricants for Poly(Vinyl Chloride)", Katsuma et al., 4/30/77.
Derwent 84-127667.
Derwent 88-171020.
"External Lubricants That Speed Fusion" by R. A. Lindner Jul./Aug. 1989, *Plastics Compounding*, pp. 50-59.
*Chemical Abstracts* 101:131746z.
Derwent 85-006905/02.
Derwent 86-212744.
Derwent 58173E.

*Primary Examiner*—Carman J. Seccuro

[57] ABSTRACT

A vinyl chloride polymer formulation having a chlorinated olefin polymer as an impact modifier, and an oxidized high density polyethylene homopolymer having an acid number of from about 5 to about 40 as a fusion promoter can be converted into shaped articles. The invention includes an improved olefin polymer impact modifier composition for use with vinyl chloride polymer formulations, the composition comprising a combination of said chlorinated olefin polymer and said oxidized high density polyethylene homopolymer. The vinyl chloride polymer formulation of the present invention is useful, for example, as a feedstock for the preparation of shaped articles such as vinyl siding and vinyl window frames.

13 Claims, No Drawings

VINYL CHLORIDE POLYMER COMPOSITION WITH IMPROVED FUSION PROPERTIES

Background of the Invention

The present invention relates to a vinyl chloride polymer composition. More specifically, the invention relates to a vinyl chloride polymer composition suitable for use in extrusion.

Vinyl chloride polymer compositions are useful for making shaped articles, such as house siding. The preparation of shaped articles, such as vinyl siding, from vinyl chloride polymer compositions via extrusion involves converting a powdered formulation of vinyl chloride polymer, impact modifier, and other ingredients into a flowable plastic mass. This conversion process involves "fusion" of the powdered formulation.

Known impact modifiers include chlorinated polyethylene, ABS resins, ethylene/vinyl acetate/carbon monoxide terpolymers, and acrylic based polymers such as methyl methacrylate/butadiene/styrene terpolymers. Acrylic based modifiers are the most commonly employed impact modifiers in vinyl chloride polymer formulations used in the vinyl siding industry. Chlorinated polyethylene is also a known impact modifier. However, the use of chlorinated polyethylene as an impact modifier in a given known formulation in place of acrylics will result in a longer fusion time. In view of the fact that chlorinated polyethylene is generally substantially less expensive than acrylics, it would be desirable from an economic standpoint to have a vinyl chloride polymer formulation in which the use of chlorinated polyethylene as an impact modifier would result in a shorter fusion time, said time being comparable to the fusion time of vinyl chloride polymer formulations having acrylic impact modifiers.

SUMMARY OF THE INVENTION

The present invention is such a vinyl chloride polymer formulation having a chlorinated olefin polymer as an impact modifier, and a fusion-promoting amount of an oxidized high density polyethylene homopolymer having an acid number of from about 5 to about 40. In another aspect, the invention is a process wherein said formulation is converted into a shaped article. In yet another aspect the invention is an improved olefin polymer impact modifier composition for use with vinyl chloride polymer formulations, the composition comprising a combination of said chlorinated olefin polymer and said oxidized high density polyethylene homopolymer.

The vinyl chloride polymer formulation of the present invention is useful, for example, as a feedstock for the preparation of shaped articles, such as vinyl siding and vinyl window frames.

DETAILED DESCRIPTION OF THE INVENTION

The process of the present invention requires a vinyl chloride polymer, a chlorinated olefin polymer, and an oxidized high density polyethylene homopolymer.

The vinyl chloride polymer employed in the present invention contains at least about 95 weight percent of polymerized vinyl chloride in the polymer molecule with the remainder being at least one monoethylenically unsaturated comonomer. The vinyl chloride polymer included in the polymer blends may be any rigid or essentially rigid vinyl chloride polymer such as vinyl chloride homopolymers and interpolymers of vinyl chloride with interpolymerizable monomers such as vinyl esters of organic acids containing 1 to 18 carbon atoms, e.g., vinyl acetate, vinyl stearate, and so forth; vinylidene chloride; symmetrical dichloroethylene; acrylonitrile; methacrylonitrile; alkyl acrylate esters in which the alkyl group contains 1 to 8 carbon atoms, e.g., methyl acrylate and butyl acrylate; the corresponding alkyl methacrylate esters; dialkyl esters of dibasic organic acids in which the alkyl groups contain 1-8 carbon atoms, e.g., dibutyl fumarate, diethyl maleate, and so forth. Preferably, the vinyl chloride polymer is the homopolymer of vinyl chloride.

The chlorinated olefin polymer employed in the present invention is a polymer prepared by the chlorination of an olefin polymer. Preferably, the chlorinated olefin polymer is prepared by chlorinating an olefin polymer having an essentially linear structure, said polymer being selected from the group consisting of polyethylene and interpolymers of ethylene and one or more ethylenically unsaturated comonomers, with ethylene making up at least 90 mole percent of the total monomer composition. It is preferred to employ 1-olefins as comonomers. Examples of preferred 1-olefin monomers include 1-butene and 1-octene. Suitable chlorinated olefin polymers have a weight average molecular weight of at least about 50,000. Preferably, the molecular weight of the chlorinated olefin polymer is between about 50,000 and 2,000,000. The chlorinated olefin polymer employed in the present invention suitably has from about 15 to about 45 weight percent chemically combined chlorine. Preferably, the chemically combined chlorine is from about 30 to about 40 weight percent of the chlorinated olefin polymer. Preferably, the chlorinated olefin polymer has a crystallinity of less than about 10 percent when containing about 34 or more weight percent of chlorine. Preferred examples of chlorinated polymers are those taught in U.S. Pat. Nos. 3,454,544; 3,819,554; and 4,767,823, the teachings of which are incorporated herein by reference. The chlorinated vinyl polymer composition of the present invention contains chlorinated olefin polymer in an amount sufficient to provide impact resistance over a range of from about −20° C. to about 80° C. Preferably, from about 2 to about 10 or more parts by weight of chlorinated olefin polymer per 100 parts by weight of the vinyl chloride polymer. Most preferably, from about 4 to about 6 parts of chlorinated olefin polymer are employed.

The fusion promoter employed in the present invention is an oxidized high density polyethylene homopolymer having an acid number of from about 5 to about 40. Preferably, the acid number is from about 10 to about 30, and most preferably the acid number is from about 12 to about 18. Suitably, the weight average molecular weight of the oxidized polyethylene homopolymer is from about 1,000 to about 20,000; preferably, the oxidized polyethylene molecular weight is from about 8,000 to about 10,000. It is preferred to employ an oxidized polyethylene homopolymer having an average particle size of from about 6 to about 15 mils (from about 150 to about 380 microns). Preferably, the Brookfield melt viscosity of the fusion promoter is from about 4,500 centipoise to about 15,000 centipoise at 150° C., and more preferably is from about 8,000 to about 9,000 centipoise at 150° C. Preferably, the melting point of the oxidized polyethylene is from about 100° C. to about 150° C., with melting points of from about 130° C. to about 140° C. being more preferred. The fusion promoter is employed in an amount sufficient to lower the fusion time of the vinyl chloride polymer formulation to about 1 to about 1.5 minutes when the formulation is employed in a torque rheometer set at 175° C. running at 60 RPM. In a typical formulation, the oxidized polyethylene is employed in an amount ranging from about 0.05 to about 0.4 parts by weight per 100 parts of vinyl chloride polymer. Preferably, from about 0.05 to about 0.15 parts of the oxidized polyethylene homopolymer are employed. Generally speaking, within the foregoing limitations, the amount of oxidized polyethylene employed is higher when lead compounds are included in the formulation due to the high degree of external lubricity of lead compounds.

One aspect of the present invention is a composition comprising a chlorinated olefin polymer and an oxidized high density polyethylene homopolymer. Typically, from about 1 to about 3 weight parts of oxidized polyethylene are employed per 100 weight parts of chlorinated olefin polymer; preferably, from about 1.5 to about 2.5 parts of oxidized polyethylene are employed per 100 parts of chlorinated olefin polymer. This composition is readily prepared, for example, by dry blending, for example in a ribbon blender, the oxidized polyethylene with the chlorinated olefin polymer during the preparation of the chlorinated olefin polymer. For example, the oxidized polyethylene can be admixed with the chlorinated olefin polymer just prior to bagging the composition.

The compositions of the present invention are useful in the preparation of extruded vinyl-containing shaped articles, such as vinyl siding for single family dwellings. In such applications, it is common to employ other ingredients such as pigments, stabilizers, lubricants, fillers, antistatic agents, dulling or flattening agents, antioxidants and the like, as is well known to those skilled in the art. Extrusion using the compositions of the present invention surprisingly allows use of the same extrusion equipment and conditions as are used with formulations which contain acrylic or predominantly acrylic impact modifiers. Thus, the compositions of the present invention fuse more quickly than prior art compositions which contain chlorinated olefin polymer impact modifiers.

SPECIFIC EMBODIMENTS

The following preparations and examples are illustrative of the present invention, and are not to be construed as limiting. All parts and percentages are by weight unless otherwise specified.

PREPARATION ONE

An extrudable vinyl chloride polymer composition is prepared by intensive dry mixing of the following ingredients:

| Component | Parts by Weight |
| --- | --- |
| PVC Resin K-65*[1] | 100 |
| Chlorinated polyethylene impact modifier*[2] | 6 |
| Heat Stabilizer*[3] | 1.5 |
| Calcium Stearate | 1.0 |
| 165° F. Paraffin Wax | 1.0 |
| Acrylic Process Aid*[4] | 1.5 |
| TiO$_2$ | 10.0 |

-continued

| Component | Parts by Weight |
| --- | --- |
| CaCO$_3$ | 5.0 |

*[1]PVC homopolymer IV.91 Shintech 950, Shintech, Inc.
*[2]Chlorinated polyethylene homopolymer 36% Cl, Tyrin ® 3615, The Dow Chemical Company
*[3]Organotin mercaptide, 15-17% Sn, T-137, M & T Chemicals, Inc.
*[4]Polymethylmethacrylate, Paraloid K120N, Rohm & Haas Co.

The fusion time of this material is recorded in Table I.

EXAMPLES 1–4

The procedure of Preparation One is repeated except that an oxidized high density polyethylene homopolymer, available under the trade name Polyethylene AC-316A from Allied-Signal, Incorporated, is also employed in the composition. The amount of fusion promoter and the fusion time for each composition is recorded in Table I.

COMPARATIVE EXPERIMENT 5

(Not an Embodiment of the Present Invention)

A composition is prepared according to the procedure of Preparation One except that the chlorinated polyethylene impact modifier is replaced with 6 parts of an acrylic modifier available from M & T Chemicals, Inc. under the trade name D-200. The fusion time for this composition is recorded in Table I.

As can be seen from the data in Table I, the fusion time surprisingly decreases with the use of the oxidized high density polyethylene fusion promoter. Unexpectedly, Example 1 shows that the addition of 0.1 part of oxidized high density polyethylene homopolymer lowers the fusion time of the composition of Preparation 1 to about the same fusion time obtained using an acrylic impact modifier-containing composition.

Examples 2–4 indicate that higher levels of oxidized high density polyethylene homopolymer can be employed to achieve faster fusion. Faster fusion is required, for example, with higher levels of filler, or with higher extrusion rates. Accordingly, the present invention can be employed to provide economic advantages, such as, for example, by using a composition having more filler, thus lowering the cost of the extrudable composition. Similarly, the cost of operation can be reduced by using the composition of the invention to extrude at higher rates.

TABLE I

Effect of Fusion Promoter Concentration on Fusion Time

| Composition | Parts OPE* | Fusion Time (Min.)** |
| --- | --- | --- |
| Prep'n 1 | zero | >2.5 |
| Ex. 1 | 0.1 | 1.4 |
| Ex. 2 | 0.2 | 1.0 |
| Ex. 3 | 0.3 | .75 |
| Ex. 4 | 0.4 | .5 |
| C.E. 5 | zero | 1.5 |

*oxidized high density polyethylene homopolymer.
**Fusion time data for each composition is acquired using a Haake torque rheometer, charged with 65 grams of material, operating at 60 RPM and 175° C.

What is claimed is:

1. A composition comprising polyvinyl chloride, an impact-modifying amount of a chlorinated olefin polymer, and a fusion-promoting amount of an oxidized high density polyethylene homopolymer from about 0.05 to about 0.15 weight parts per 100 weight parts of polyvinyl chloride having an acid number of from about 5 to about 40.

2. The composition of claim 1 wherein the oxidized high density polyethylene homopolymer has a weight average molecular weight of at least about 1,000; a Brookfield melt viscosity at 150° C. of from about 4500 cps to about 15,000 cps; an average particle size of from about 6 to about 15 mils; and a melting point of from about 100° C. to about 150° C.

3. The composition of claim 1 wherein the fusion promoter is employed in amount sufficient to give the composition a fusion time of from about 1 to about 1.5 minutes when measured on a Haake torque rheometer charged with 65 grams of material and operating at 60 RPM and 175° C.

4. The composition of claim 1 wherein the fusion promoter is employed in amount sufficient to give the composition a stock temperature, in an extruder operated at the same conditions for each composition, which is about the same as that of a comparative composition which is equivalent except that the comparative composition has an acrylic impact modifier rather than chlorinated olefin polymer, and the comparative composition has no oxidized high density polyethylene homopolymer.

5. The composition of claim 4 wherein the stock temperature of the composition is within ±5° C. of the stock temperature of the comparative composition.

6. The composition of claim 1 wherein the chlorinated olefin polymer is chlorinated polyethylene.

7. A fabricated article prepared using the composition of claim 1.

8. A process for improving the fusion of a mixture comprising polyvinyl chloride and an impact-modifying amount of a chlorinated olefin polymer, the process comprising admixing with the polyvinyl chloride and the chlorinated olefin polymer from about 0.05 to about 0.15 weight parts, per 100 weight parts of polyvinyl chloride, an oxidized high density polyethylene homopolymer to obtain an admixture which exhibits a lower fusion temperature than a comparative composition which is identical to said admixture except that the comparative composition has none of the oxidized high density polyethylene homopolymer.

9. The process of claim 8 wherein the oxidized high density polyethylene homopolymer has an acid number of from about 10 to about 30.

10. The process of claim 9 wherein the oxidized high density polyethylene homopolymer has a weight average molecular weight of at least about 1,000; a melt viscosity at 150° C. of from about 4500 cps to about 15,000 cps; a particle size of from about 6 to about 15 mils; and a melting point of from about 100° C. to about 150° C.

11. The process of claim 8 wherein the oxidized high density polyethylene homopolymer is employed in amount sufficient to give the composition a fusion time of from about 1 to about 1.5 minutes when measured on a Haake torque rheometer charged with 65 grams of material and operating at 60 RPM and 175° C.

12. The process of claim 8 wherein the chlorinated olefin polymer has a chlorine content of from about 30 to about 40 percent.

13. The process of claim 8 wherein the chlorinated olefin polymer is chlorinated polyethylene.

* * * * *